United States Patent
Welch

(10) Patent No.: US 11,739,471 B2
(45) Date of Patent: Aug. 29, 2023

(54) WASHING APPLIANCE HAVING A RECIRCULATION CIRCUIT

(71) Applicant: WHIRLPOOL CORPORATION, Benton Harbor, MI (US)

(72) Inventor: Rodney M. Welch, Eau Claire, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 80 days.

(21) Appl. No.: 17/329,536

(22) Filed: May 25, 2021

(65) Prior Publication Data

US 2021/0274995 A1  Sep. 9, 2021

Related U.S. Application Data

(62) Division of application No. 15/891,628, filed on Feb. 8, 2018, now Pat. No. 11,039,728.

(60) Provisional application No. 62/464,405, filed on Feb. 28, 2017.

(51) Int. Cl.
| | | |
|---|---|---|
| *D06F 39/08* | (2006.01) | |
| *A47L 15/42* | (2006.01) | |
| *B01D 21/26* | (2006.01) | |
| *D06F 39/00* | (2020.01) | |
| *C02F 1/44* | (2023.01) | |
| *C02F 1/463* | (2023.01) | |

(52) U.S. Cl.
CPC ........ *D06F 39/085* (2013.01); *A47L 15/4206* (2013.01); *A47L 15/4219* (2013.01); *A47L 15/4291* (2013.01); *B01D 21/26* (2013.01); *D06F 39/006* (2013.01); *C02F 1/444* (2013.01); *C02F 1/463* (2013.01); *D06F 39/083* (2013.01)

(58) Field of Classification Search
CPC .................................................... D06F 39/085
See application file for complete search history.

(56) References Cited

U.S. PATENT DOCUMENTS

| | | | |
|---|---|---|---|
| 5,234,400 | A | 8/1993 | Kluge |
| 5,837,151 | A | 11/1998 | Jozwiak |
| 5,928,490 | A | 7/1999 | Sweeney |
| 6,001,190 | A | 12/1999 | El-Shoubary et al. |
| 6,343,611 | B1 | 2/2002 | El-Shoubary et al. |
| 8,371,315 | B2 | 2/2013 | Denison et al. |
| 2003/0188976 | A1 | 10/2003 | Culvey et al. |
| 2004/0079706 | A1 | 4/2004 | Mairal et al. |
| 2013/0327361 | A1 | 12/2013 | Biswas et al. |

(Continued)

FOREIGN PATENT DOCUMENTS

| | | |
|---|---|---|
| EP | 3128065 A1 | 2/2017 |
| JP | 2002119794 A | 4/2002 |
| KR | 100820792 B1 | 4/2008 |

OTHER PUBLICATIONS

European Search Report for Counterpart EP18157044.1, dated Aug. 6, 2018.

*Primary Examiner* — Peter Keyworth

(74) *Attorney, Agent, or Firm* — McGarry Bair PC

(57) ABSTRACT

A method of treating at least one of laundry or dishes in a treating chamber of an appliance comprising, recirculating liquid through the treating chamber, centrifugally removing particles greater than a predetermined size from the liquid during recirculation of the liquid, and coagulating particles greater than the predetermined size in the liquid during recirculation of the liquid.

17 Claims, 4 Drawing Sheets

(56) References Cited

U.S. PATENT DOCUMENTS

| | | | |
|---|---|---|---|
| 2014/0283312 A1* | 9/2014 | Bocchino | D06F 39/006 68/12.01 |
| 2015/0267340 A1 | 9/2015 | Malheiros | |
| 2016/0176741 A1* | 6/2016 | Gao | C02F 1/463 210/195.1 |
| 2016/0183763 A1 | 6/2016 | Li et al. | |

* cited by examiner

WASHING APPLIANCE HAVING A RECIRCULATION CIRCUIT

CROSS-REFERENCE TO RELATED APPLICATION(S)

This application is a divisional application of U.S. patent application Ser. No. 15/891,628, filed Feb. 8, 2018, now U.S. Pat. No. 11,039,728, issued Jun. 22, 2021, which claims priority to U.S. Provisional Patent Application No. 62/464,405, filed Feb. 28, 2017, both of which are hereby incorporated herein by reference in their entirety.

BACKGROUND

Conventional automatic cleaning appliances, such as washing machines, dishwashers, and the like, involve the mixing of treating chemistry with water to create a wash liquid or rinse liquid to facilitate the cleaning process. Soils can be loosened during the cleaning process, and various methods exist to remove such soils from the wash or rinse liquid during the cleaning process.

BRIEF SUMMARY

In one aspect, the disclosure relates to a method of treating at least one of laundry or dishes in a treating chamber of an appliance. The method includes recirculating liquid through the treating chamber, centrifugally removing particles greater than a predetermined size from the liquid during recirculation of the liquid, and coagulating particles greater than the predetermined size in the liquid during recirculation of the liquid.

In another aspect, the disclosure relates to a method of treating at least one of laundry or dishes in a treating chamber of an appliance. The method includes implementing a wash and a rinse cycle, recirculating liquid through the treating chamber during the wash and rinse cycle, centrifugally removing particles greater than a predetermined size from the liquid during recirculation of the liquid; and coagulating particles greater than the predetermined size in the liquid during recirculation of the liquid during the rinse cycle and not during the wash cycle.

DETAILED DESCRIPTION OF THE DRAWINGS

Figure 1:
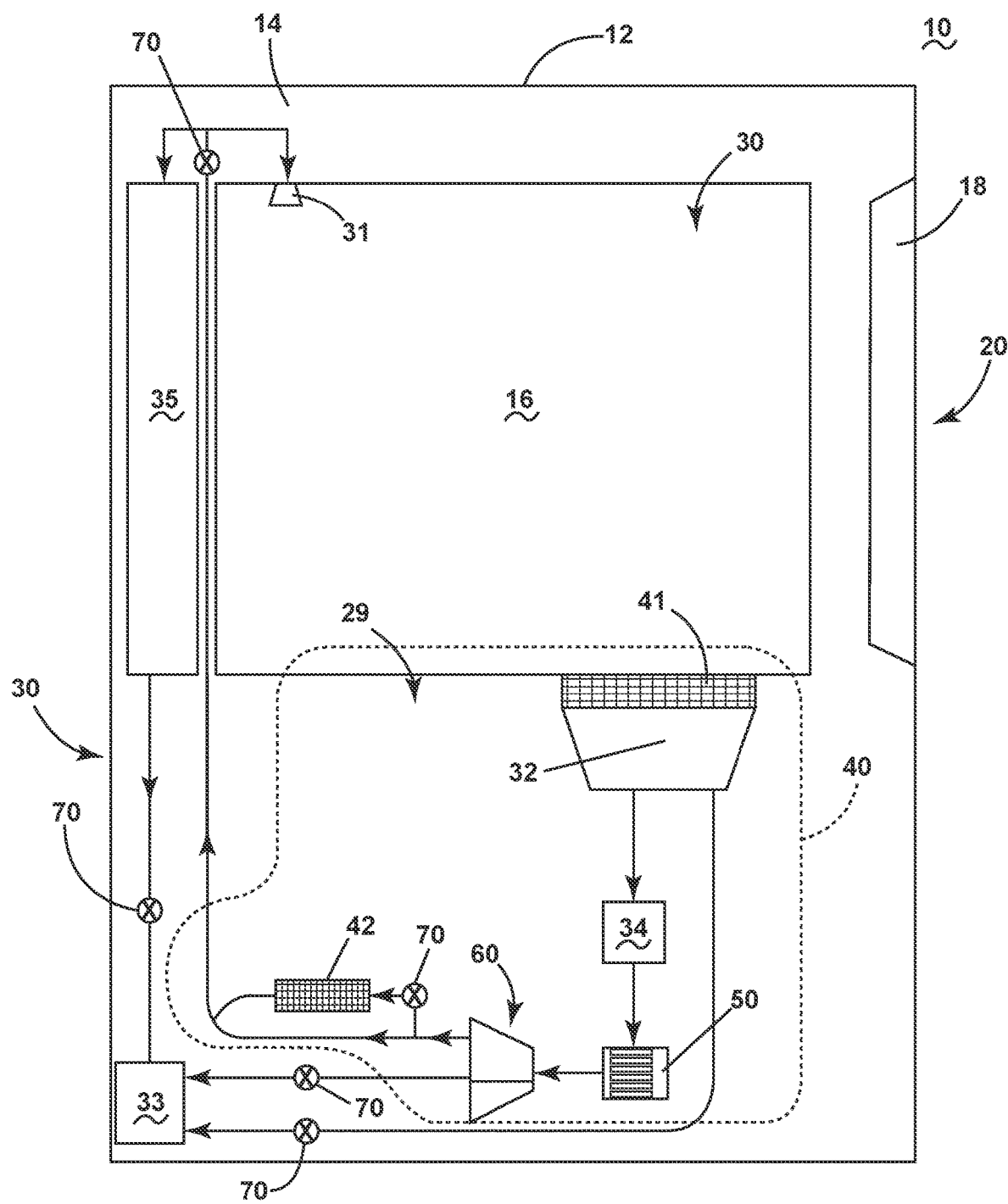
FIG. 1 is a schematic view of an exemplary washing appliance in accordance with various aspects of the present disclosure.

FIG. 1 is a schematic illustration of a washing appliance 10, which will not be described in detail except as necessary for a complete understanding of the disclosure. It should be understood that the washing appliance 10 can include a clothes washer or dishwasher, and that the various aspects in the present disclosure can be used in any suitable washing appliance, including a vertical-axis clothes washer, horizontal-axis clothes washer, combination washer-dryer, free-standing dishwasher, or under-counter dishwasher, in non-limiting examples.

The washing appliance 10 can include a cabinet 12 defining an interior and an access opening 18 of the washing appliance 10, a tub 14 provided within the cabinet 12 and at least partially defining a treating chamber 16 for receiving articles for treatment, such as dishes or laundry. A door assembly 20 can be mounted to the cabinet 12 to selectively open and close the access opening 18 of the tub 14 while also providing access to the treating chamber 16 for the loading and unloading of the items. The door assembly 20 can be hingedly connected with the cabinet 12 or slidingly attached to a drawer slide system to selectively provide access to the treating chamber 16.

The washing appliance 10 can further include a fluid circuit 29 including the treating chamber 16, at least one sprayer 31, a sump 32, and a drain pump 33. The fluid circuit 29 is illustrated herein as a recirculation circuit 30 also having a recirculation pump 34 and a reuse tank 35. The sprayer 31 can provide water to the treating chamber 16, after which the water can flow into the sump 32 where it can be collected in the reuse tank 35 and directed back to the sprayer 31 by the recirculation pump 34. It is also contemplated that the drain pump 33 can be fluidly coupled to the reuse tank 35 to drain collected water. In another example the fluid circuit 29 can optionally be a non-recirculating fluid circuit, where water can flow from the sprayer 31 into the treating chamber 16 and move into the sump 32 before being drained by the drain pump 33.

A filtration system 40 for the washing appliance 10 can be fluidly coupled to the circuit 30 and can include a coarse filter 41, a particle filter 42, an electrocoagulation unit (EU) 50, and a centrifugal separator (CS) 60. The coarse filter 41 can include a wire or plastic mesh capable of capturing large particles/soils, while the particle filter 42 can include an ultrafiltration filter or nanofiltration filter capable of trapping smaller particles down to 1.0 µm or 1.0 nm in size, respectively. The centrifugal separator 60, illustrated here as a horizontal centrifuge and seen in further detail in FIG. 2, can include a cone-shaped body 61 and particle reservoir 62. The body 61 can rotate about a central axis and form a rotating column of water at a speed such that soil particles of a predetermined size or density within the water can undergo centrifugation, moving outward for collection in the particle reservoir 62. The electrocoagulation unit 50, also seen in further detail in FIG. 2, can include any standard/known EU wherein a chamber 51 containing a series of charged plates/electrodes 52 can be used to apply an electrical charge to water in the chamber. In a preferred example the electrodes 52 can be made of graphite, however any material suitable for the electrode environment can be used, including aluminum. In operation, smaller dissolved soils in the EU 50, in non-limiting examples such as particles in colloidal suspension or oxidized metal ions, can coagulate and form larger particles which can be more easily removed by the centrifugal separator 60.

The filtration system 40 can be fluidly coupled to the circuit 30 such that the electrocoagulation unit 50 is positioned upstream of the centrifugal separator 60. There can be a water shear present within the recirculation pump 34 that can break apart coagulated soils, and in a preferred embodiment the recirculation pump 34 can be positioned upstream of both the CS 60 and EU 50 so as not to counter the action of the electrocoagulation unit 50. The coarse filter 41 can be positioned between the treating chamber 16 and sump 32, and the particle filter 42 can be positioned on a separate fluid branch wherein a portion of the water in the circuit 30 can flow through the particle filter 42 as shown. The particle filter 42 can be placed downstream of the centrifugal separator 60 in a non-limiting example.

In addition, a valve or set of valves 70 can be coupled to the recirculation circuit 30. A valve 70 can be connected to the particle reservoir 62 to selectively remove soils collected in the reservoir 62, or connected to the drain pump 33 to selectively drain water from the treating chamber 16 or reuse tank 35, or connected to the particle filter 42 to selectively remove additional soils from the water, in non-limiting examples. The valves 70 can optionally be used to selectively direct water to the reuse tank 35.

Figure 2:
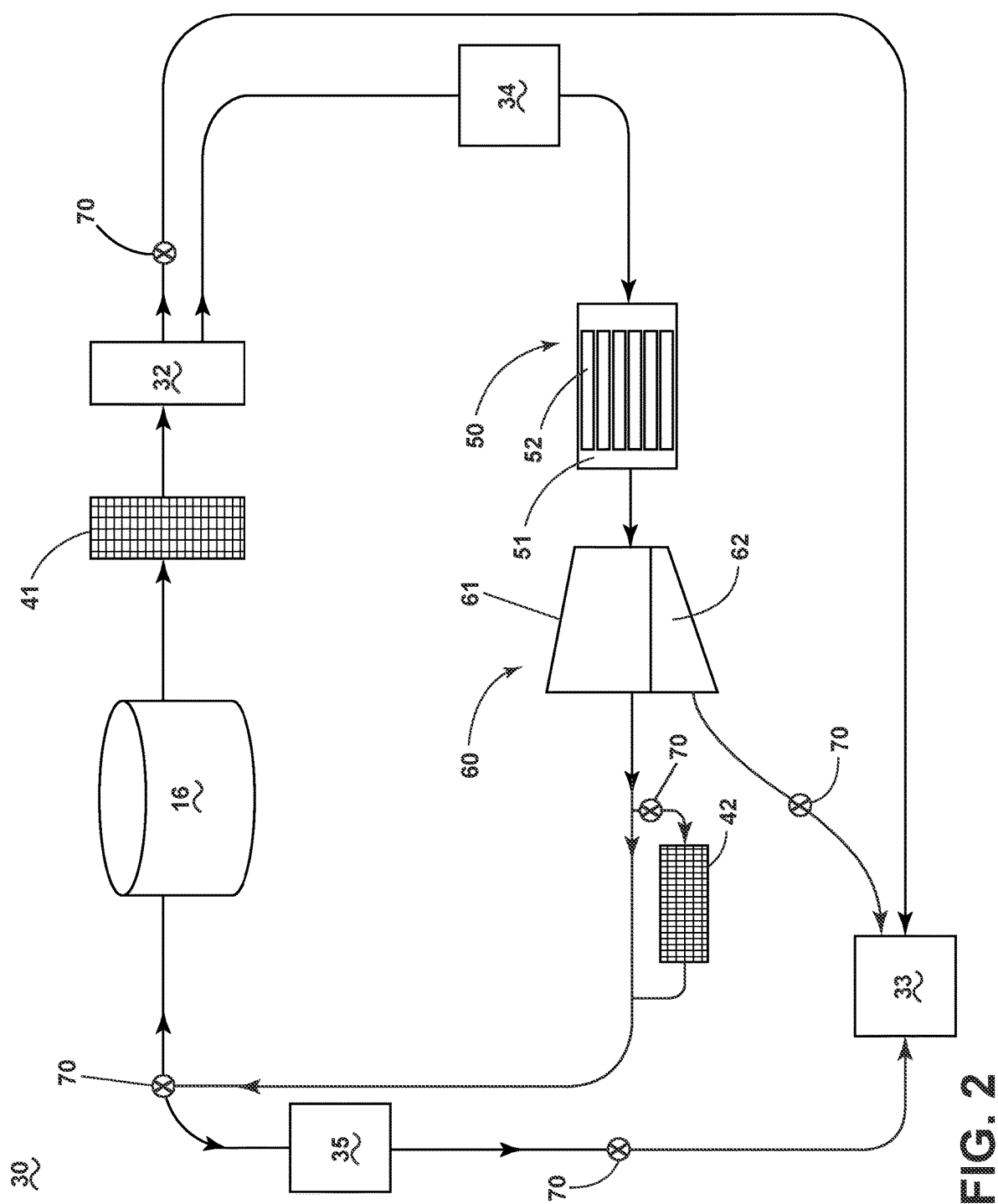
FIG. 2 is a diagram of a recirculation circuit in the washing appliance of FIG. 1.

FIG. 2 illustrates the circuit, illustrated here as the recirculation circuit 30. In operation, liquid can be supplied to the treating chamber 16 through the sprayer 31, after which it flows through the sump 32, particle filter 42 and optionally into the reuse tank 35, and the recirculation pump 34 can also return the liquid back into the treating chamber 16. In addition, water from the treating chamber 16 can optionally be drained by the drain pump 33. The recirculation pump 34 can also direct at least a portion of the supplied liquid, or at least a portion of the recirculated liquid, to the electrocoagulation unit 50 in order to coagulate soils into larger particles. The liquid and coagulated particles can then move into the centrifugal separator 60, where the coagulated particles can be collected in the particle reservoir 62 and drained by the drain pump 33 while the purified liquid can move into the reuse tank 35. At least a portion of the purified liquid from the centrifugal separator 60 can also be directed through the particle filter 42 to remove particles of a size small enough to remain in the water during centrifugation.

It is contemplated that during a wash cycle, the electrocoagulation unit 50 can be switched off to prevent any undesired breakdown of treating chemistry in the wash liquor such that water, treating chemistry, and soils can flow through the EU 50 and remove buildup on the electrodes. The centrifugal separator 60 downstream of the EU 50 can remove soils, treating chemistry, and electrode buildup such that water flowing through the recirculation circuit 30 during a wash phase can be of sufficient quality to be used in a later rinse phase.

It is further contemplated that during a rinse cycle, the electrocoagulation unit 50 can be switched on to aid the centrifugal separator 60 in purifying the water in the recirculation circuit 30. The polarity of the electrodes 52 in the EU 50 can be repeatedly reversed to prevent buildup on the electrodes 52, and in one non-limiting example the polarity can be reversed every sixty seconds. Water can then flow into the centrifugal separator 60 in order to collect coagulated soils as described above.

It can be appreciated that size of the particles generated by the electrocoagulation unit 50 can be selected by modifying operating parameters of the electrocoagulation unit 50 such as, but not limited to, the electrode voltage or rate of polarity reversal. Similarly, the efficacy of particle settling by the centrifugal separator 60 can depend on parameters such as, but not limited to, the size, mass, or density of soil particles, or the rotational velocity of the liquid. Particles with a larger mass or density compared to the surrounding liquid can settle out of the liquid at a faster rate, and it can therefore be advantageous to coagulate smaller soil particles into larger ones by operating the electrocoagulation unit 50 before directing liquid and soils into the centrifugal separator 60 for more efficient removal of soils. In this manner, the larger soils can be removed from the liquid by the electrocoagulation unit 50 and centrifugal separator 60 while smaller soils can be collected by the particle filter 42, preventing unnecessary clogging of the particle filter 42 by larger soil particles in the liquid and extending the useful lifetime of the particle filter 42.

It can be further appreciated that purifying wash water for use in a rinse cycle, or purifying rinse water during a rinse cycle, can allow for a reduction in total water usage by the washing appliance 10 which can also reduce the cost to the consumer for operating the washing appliance 10.

Figure 3:
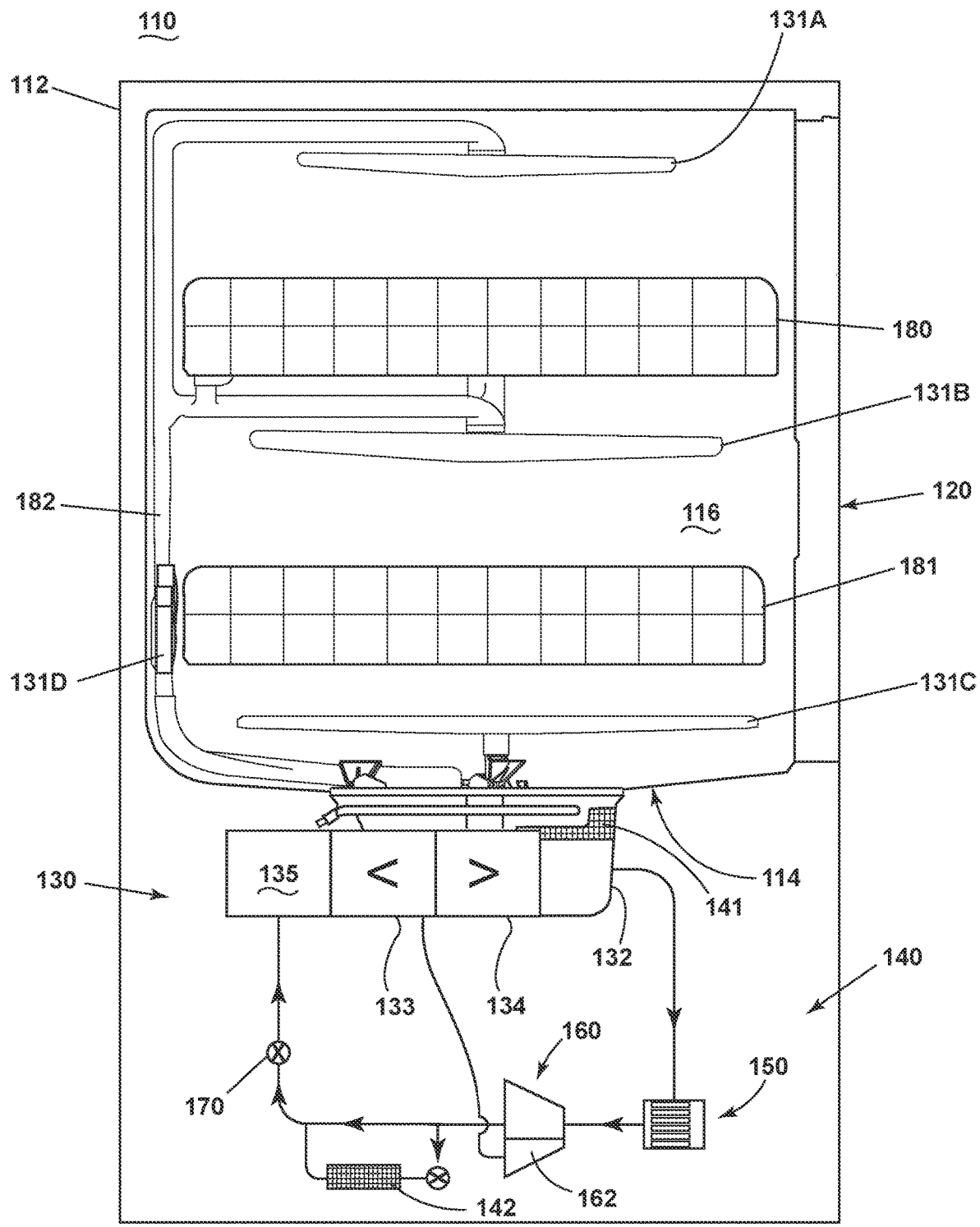
FIG. 3 illustrates the exemplary washing appliance of FIG. 1 in the form of a dishwasher.

Referring now to FIG. 3, another washing appliance is illustrated in the form of a dishwasher 111. The dishwasher 111 is similar to the washing appliance 10; therefore, like parts will be identified with like numerals increased by 100, with it being understood that the description of the like parts of the washing appliance 10 applies to the dishwasher 111, unless otherwise noted.

In the example of FIG. 3, the dishwasher 111 can include a cabinet 112 defining an interior of the dishwasher 111 and including a frame, with or without panels mounted to the frame. An open-faced tub 114 can be provided within the cabinet 112 and can at least partially define a treating chamber 116, having an open face, for washing dishes. A door assembly 120 can be movably mounted to the dishwasher 111 for movement between opened and closed positions to selectively open and close the open face of the tub 114. Thus, the door assembly provides accessibility to the treating chamber 116 for the loading and unloading of dishes or other washable items.

It should be appreciated that the door assembly 120 can be secured to the lower front edge of the cabinet 112 or to the lower front edge of the tub 114 via a hinge assembly (not shown) configured to pivot the door assembly 120. When the door assembly 120 is closed, user access to the treating chamber 116 can be prevented, whereas user access to the treating chamber 116 can be permitted when the door assembly 120 is open.

Dish holders, illustrated in the form of upper and lower dish racks 180, 181 are located within the treating chamber 116 and receive dishes for washing. The upper and lower racks 180, 181 are typically mounted for slidable movement in and out of the treating chamber 116 for ease of loading and unloading. Other dish holders can be provided, such as a silverware basket. As used in this description, the term "dish(es)" is intended to be generic to any item, single or plural, that can be treated in the dishwasher 111, including, without limitation, dishes, plates, pots, bowls, pans, glassware, and silverware.

A set of sprayers 131 provided for spraying liquid in the treating chamber 116 and is provided in the form of a first lower spray assembly 131A, a second lower spray assembly 131B, a rotating mid-level spray arm assembly 131C, and/or an upper spray arm assembly 131D. Upper sprayer 131D, mid-level rotatable sprayer 131C and lower rotatable sprayer 131A can be located, respectively, above the upper rack 180, beneath the upper rack 180, and beneath the lower rack 181 and are illustrated as rotating spray arms. The second lower spray assembly 131B is illustrated as being located adjacent the lower dish rack 181 toward the rear of the treating chamber 116.

A recirculation circuit 130 can be provided for recirculating liquid from the treating chamber 116 to the set of sprayers 131. The recirculation circuit 130 can include a sump 132, a drain pump 133, a recirculation pump 134, and a reuse tank 135. The sump 132 can collect the liquid sprayed in the treating chamber 116 and can be formed by a sloped or recess portion of a bottom wall of the tub 114. The drain pump 133 can draw liquid from the sump 132 and pump the liquid out of the dishwasher 110 to a household drain line (not shown). The recirculation pump 134 can draw liquid from the sump 132, and the liquid can be simultaneously or selectively pumped through a supply tube 182 to the set of sprayers 131 for selective spraying. While not shown, a liquid supply system can include a water supply conduit coupled with a household water supply for supplying water to the treating chamber 116.

A filtration system 140 can be fluidly coupled to the recirculation circuit 130 and include a coarse filter 141, a particle filter 142, an electrocoagulation unit (EU) 150 and a centrifugal separator (CS) 160. A set of valves 170 can also be coupled to the recirculation circuit 130 to selectively remove soils collected the CS 160, selectively supply water to or drain water from the treating chamber 116 or reuse tank 135, or selectively remove additional soils from the water via the particle filter 142, in non-limiting examples. It can be appreciated that operation of the EU 150 and CS 160 can coagulate and remove soils within the recirculation circuit 130 in a manner similar to that described in FIG. 2.

Figure 4:
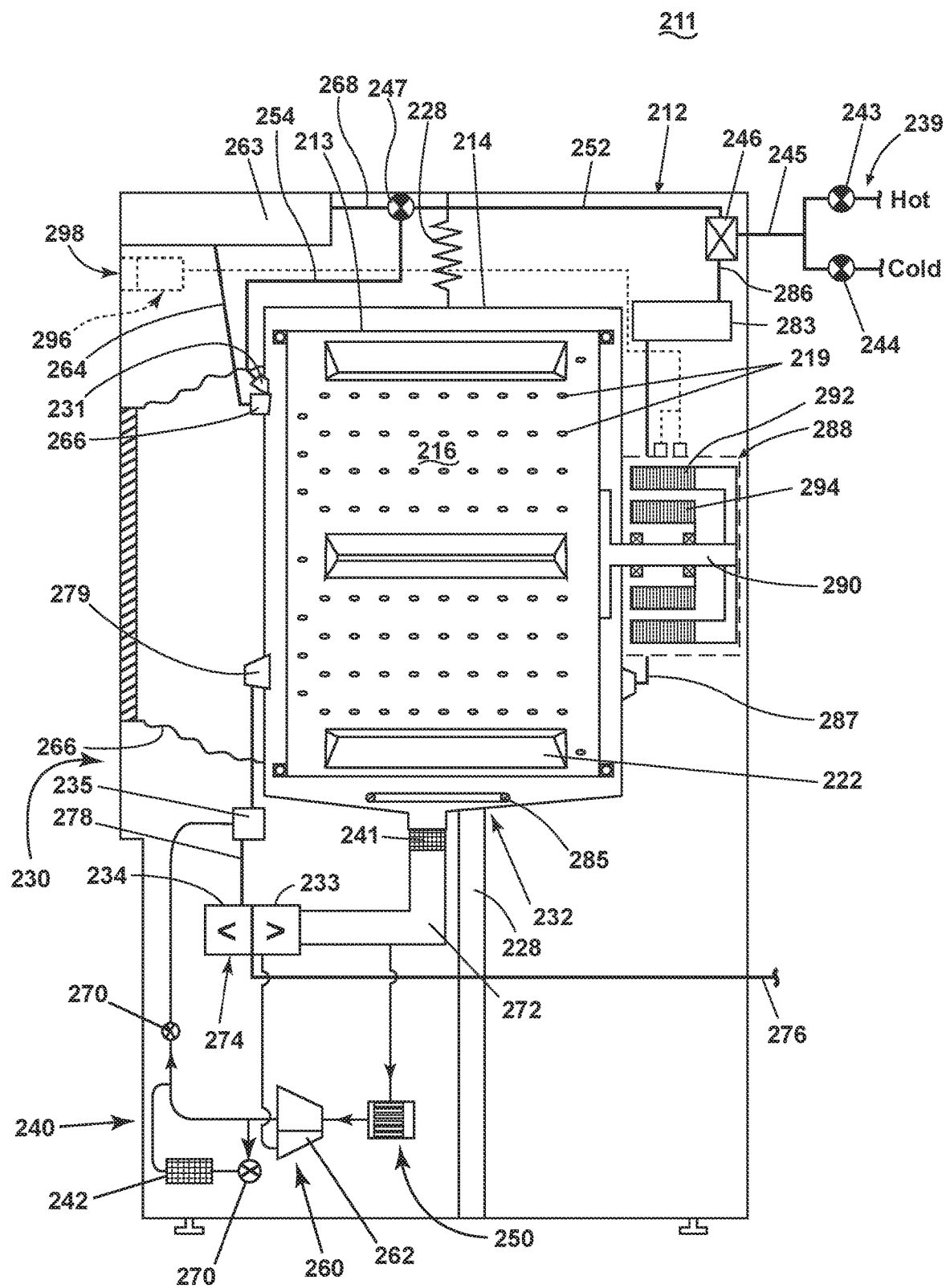
FIG. 4 illustrates the exemplary washing appliance of FIG. 1 in the form of a clothes washer.

Turning to FIG. 4, another washing appliance is illustrated in the form of a clothes washer 211. The clothes washer 211 is similar to the washing appliance 10; therefore, like parts will be identified with like numerals increased by 100, with it being understood that the description of the like parts of the washing appliance 10 applies to the clothes washer 211, unless otherwise noted.

The washing appliance of FIG. 4 is illustrated as a clothes washer 211, which can include a structural support system including a cabinet 212 which defines a housing within which a laundry holding system resides. The cabinet 212 can be a housing having a chassis and/or a frame, defining an interior enclosing components typically found in a conventional washing machine, such as motors, pumps, fluid lines, controls, sensors, transducers, and the like. Such components will not be described further herein except as necessary for a complete understanding of the disclosure.

The laundry holding system includes a tub 214 supported within the cabinet 212 by a suitable suspension system and a drum 213 provided within the tub 214, the drum 213 defining at least a portion of a laundry treating chamber 216. The drum 213 can include a plurality of perforations 219 such that liquid can flow between the tub 214 and the drum 213 through the perforations 219. A plurality of baffles 222 can be disposed on an inner surface of the drum 213 to lift the laundry load received in the treating chamber 216 while the drum 213 rotates. It is also within the scope of the disclosure for the laundry holding system to include only a tub with the tub defining the laundry treating chamber.

The laundry holding system can further include a door 220 which can be movably mounted to the cabinet 212 to selectively close both the tub 214 and the drum 213. A bellows 226 can couple an open face of the tub 214 with the cabinet 212, with the door 220 sealing against the bellows 226 when the door 220 closes the tub 214.

The clothes washer 211 can further include a suspension system 228 for dynamically suspending the laundry holding system within the structural support system.

The clothes washer 211 can further include a liquid supply system for supplying water to the clothes washer 211 for use in treating laundry during a cycle of operation. The liquid supply system can include a source of water, such as a household water supply 239, which can include separate valves 243 and 244 for controlling the flow of hot and cold water, respectively. Water can be supplied through an inlet conduit 245 directly to the tub 214 by controlling first and second diverter mechanisms 246 and 247, respectively. The diverter mechanisms 246, 247 can be a diverter valve having two outlets such that the diverter mechanisms 246, 247 can selectively direct a flow of liquid to one or both of two flow paths. Water from the household water supply 239 can flow through the inlet conduit 245 to the first diverter mechanism 246 which can direct the flow of liquid to a supply conduit 252. The second diverter mechanism 247 on the supply conduit 252 can direct the flow of liquid to a tub outlet conduit 254 which can be provided with a spray nozzle or sprayer 231 configured to spray the flow of liquid into the tub 214. In this manner, water from the household water supply 239 can be supplied directly to the tub 214.

The clothes washer 211 can also be provided with a dispensing system for dispensing treating chemistry to the treating chamber 216 for use in treating the laundry according to a cycle of operation. The dispensing system can include a dispenser 263 which can be a single use dispenser, a bulk dispenser or a combination of a single and bulk dispenser.

Regardless of the type of dispenser used, the dispenser 263 can be configured to dispense a treating chemistry directly to the tub 214 or mixed with water from the liquid supply system through a dispensing outlet conduit 264. The dispensing outlet conduit 64 can include a dispensing nozzle 266 configured to dispense the treating chemistry into the tub 214 in a desired pattern and under a desired amount of pressure. For example, the dispensing nozzle 266 can be configured to dispense a flow or stream of treating chemistry into the tub 214 by gravity, i.e. a non-pressurized stream. Water can be supplied to the dispenser 263 from the supply conduit 252 by directing the diverter mechanism 247 to direct the flow of water to a dispensing supply conduit 268.

Non-limiting examples of treating chemistries that can be dispensed by the dispensing system during a cycle of operation include one or more of the following: water, enzymes, fragrances, stiffness/sizing agents, wrinkle releasers/reducers, softeners, antistatic or electrostatic agents, stain repellants, water repellants, energy reduction/extraction aids, antibacterial agents, medicinal agents, vitamins, moisturizers, shrinkage inhibitors, and color fidelity agents, and combinations thereof.

The clothes washer 211 can also include a recirculation and drain system for recirculating liquid within the laundry holding system and draining liquid from the clothes washer 211. Liquid supplied to the tub 214 through tub outlet conduit 254 and/or the dispensing supply conduit 268 typically enters a space between the tub 214 and the drum 213 and can flow by gravity to a sump 232 formed in part by a lower portion of the tub 214. The sump 232 can also be formed by a sump conduit 272 that can fluidly couple the lower portion of the tub 214 to a pump assembly 274. The pump assembly 274 can include a drain pump 233 directing liquid to a drain conduit 276, which can drain the liquid from the clothes washer 211. The pump assembly 274 can also include a recirculation pump 234 directing liquid to a recirculation conduit 278 or reuse tank 235 which can terminate at a recirculation inlet 279. The recirculation inlet 279 can direct the liquid from the recirculation conduit 278 into the drum 213. The recirculation inlet 279 can introduce the liquid into the drum 213 in any suitable manner, such as by spraying, dripping, or providing a steady flow of liquid. In this manner, liquid provided to the tub 214, with or without treating chemistry can be recirculated into the treating chamber 216 for treating the laundry within. In this manner the treating chamber 216, sprayer 231, sump 232, drain pump 233, recirculation pump 234, and reuse tank 235 can define at least a portion of a recirculation circuit 230 in the clothes washer 211.

The clothes washer 211 can further include a filtration system 240 fluidly coupled to the recirculation circuit 230. The filtration system 240 include a coarse filter 241, a particle filter 242, an electrocoagulation unit (EU) 250 and a centrifugal separator (CS) 260. A set of valves 270 can also be coupled to the recirculation circuit 130 to selectively remove soils collected the CS 260, selectively supply water to or drain water from the treating chamber 216 or reuse tank 235, or selectively remove additional soils from the water via the particle filter 242, in non-limiting examples. It can be appreciated that operation of the EU 250 and CS 260 can coagulate and remove soils within the recirculation circuit 230 in a manner similar to that described in FIG. 2.

The liquid supply and/or recirculation and drain system can be provided with a heating system which can include one or more devices for heating laundry and/or liquid supplied to the tub 214, such as a steam generator 283 and/or a sump heater 285. Liquid from the household water supply 239 can be provided to the steam generator 283 through the inlet conduit 245 by controlling the first diverter mechanism 246 to direct the flow of liquid to a steam supply conduit 286. Steam generated by the steam generator 283 can be supplied to the tub 214 through a steam outlet conduit 287. The steam generator 283 can be any suitable type of steam generator such as a flow through steam generator or a tank-type steam generator. Alternatively, the sump heater 285 can be used to generate steam in place of or in addition to the steam generator 283. In addition or alternatively to generating steam, the steam generator 283 and/or sump heater 285 can be used to heat the laundry and/or liquid within the tub 214 as part of a cycle of operation.

Additionally, the liquid supply and recirculation and drain system can differ from the configuration shown in FIG. 1, such as by inclusion of other valves, conduits, treating chemistry dispensers, sensors, such as water level sensors and temperature sensors, and the like, to control the flow of liquid through the clothes washer 211 and for the introduction of more than one type of treating chemistry.

The clothes washer 211 also includes a drive system for rotating the drum 213 within the tub 214. The drive system can include a motor 288, which can be directly coupled with the drum 213 through a drive shaft 290 to rotate the drum 213 about a rotational axis during a cycle of operation. The motor 288 can be a brushless permanent magnet (BPM) motor having a stator 292 and a rotor 294. Alternately, the motor 288 can be coupled to the drum 213 through a belt and a drive shaft to rotate the drum 213, as is known in the art. Other motors, such as an induction motor or a permanent split capacitor (PSC) motor, can also be used. The motor 288 can rotate the drum 213 at various speeds in either rotational direction.

The clothes washer 211 also includes a control system for controlling the operation of the clothes washer 211 to implement one or more cycles of operation. The control system can include a controller 296 located within the cabinet 212 and a user interface 298 that is operably coupled with the controller 296. The user interface 298 can include one or more knobs, dials, switches, displays, touch screens and the like for communicating with the user, such as to receive input and provide output. The user can enter different types of information including, without limitation, cycle selection and cycle parameters, such as cycle options.

The controller 296 can include the machine controller and any additional controllers provided for controlling any of the components of the clothes washer 211. For example, the controller 96 can include the machine controller and a motor controller. Many known types of controllers can be used for the controller 296. It is contemplated that the controller is a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), can be used to control the various components.

To the extent not already described, the different features and structures of the various embodiments can be used in combination with each other as desired. That one feature is not be illustrated in all of the embodiments is not meant to be construed that it cannot be, but is done for brevity of description. Thus, the various features of the different embodiments can be mixed and matched as desired to form new embodiments, whether or not the new embodiments are expressly described.

While the disclosure has been specifically described in connection with certain specific embodiments thereof, it is to be understood that this is by way of illustration and not of limitation. Reasonable variation and modification are possible within the scope of the forgoing disclosure and drawings without departing from the spirit of the disclosure which is defined in the appended claims.

This written description uses examples to disclose embodiments of the invention, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of treating at least one of laundry or dishes in a treating chamber of an appliance, the method comprising:
   recirculating liquid through the treating chamber;
   centrifugally removing particles greater than a predetermined size from the liquid during recirculation of the liquid during a rinse and wash cycle; and
   coagulating particles greater than the predetermined size in the liquid during recirculation of the liquid during the rinse cycle and not during the wash cycle.

2. The method of claim 1 wherein the coagulating occurs downstream of the centrifugally removing.

3. The method of claim 2 wherein the coagulating comprising coagulating particles of a size smaller than the predetermined size.

4. The method of claim 3 further comprising after the centrifugally removing and before the coagulation, filtering a portion of the liquid to remove particles less than the predetermined size.

5. The method of claim 4 further comprising storing at least some of the portion of the liquid for reuse.

6. The method of claim 3 further comprising draining the centrifugally removed particles.

7. The method of claim 6 further comprising using the liquid for both a wash cycle and a rinse cycle.

8. A method of treating at least one of laundry or dishes in a treating chamber of an appliance, the method comprising:
- implementing a wash and a rinse cycle;
- recirculating liquid through the treating chamber during the wash and rinse cycle;
- centrifugally removing particles greater than a predetermined size from the liquid during recirculation of the liquid; and
- coagulating particles greater than the predetermined size in the liquid during recirculation of the liquid during the rinse cycle and not during the wash cycle.

9. The method of claim 8 wherein the coagulating occurs downstream of the centrifugally removing.

10. The method of claim 9 wherein the coagulating comprising coagulating particles of a size smaller than the predetermined size.

11. The method of claim 3 further comprising after the centrifugally removing and before the coagulation, filtering a portion of the liquid to remove particles less than the predetermined size.

12. The method of claim 11 further comprising storing at least some of the portion of the liquid for reuse.

13. The method of claim 10 further comprising draining the centrifugally removed particles.

14. The method of claim 8 wherein controlling the coagulating of particles greater than the predetermined size during the rinse cycle and not during the wash cycle is performed by a controller.

15. The method of claim 8 wherein the centrifugally removing particles greater than a predetermined size from the liquid during recirculation of the liquid is performed by a centrifugal separator (CS).

16. The method of claim 8 wherein the coagulating particles greater than the predetermined size in the liquid during recirculation of the liquid during the rinse cycle and not during the wash cycle is performed by an electrocoagulation unit (EU).

17. The method of claim 8 wherein the method is performed in one of a washing machine or a dishwasher.

\* \* \* \* \*